United States Patent [19]
Ault

[11] 3,746,790
[45] July 17, 1973

[54] AUTOMATIC TELEPHONE INTERFACE DEVICE

[76] Inventor: C. M. Ault, 2740 S. Sheridan Ave., Indianapolis, Ind. 46203

[22] Filed: May 27, 1971

[21] Appl. No.: 147,365

[52] U.S. Cl. .......... 179/1 HF
[51] Int. Cl. .......... H04m 11/00
[58] Field of Search .......... 179/1 C, 1 HF, 2 C, 179/2 A, 2 TC

[56] References Cited

UNITED STATES PATENTS

| | | | |
|---|---|---|---|
| 3,530,250 | 9/1970 | Schaum | 179/1 HF |
| 3,038,965 | 6/1962 | Civitano | 179/1 HF |
| 2,826,636 | 2/1958 | Beatty | 179/1 HF |
| 3,548,102 | 12/1970 | Schaum | 179/2 A |
| 3,325,598 | 6/1967 | O'Neill | 179/2 A |

*Primary Examiner*—Kathleen H. Claffy
*Assistant Examiner*—Jon Bradford Leaheey
*Attorney*—Millen, Raptes & White

[57] ABSTRACT

A telephone interface device is provided for seizing and holding a telephone line after a predetermined ringing cycle duration while further controlling the duration of the line seizure to connect peripheral equipment devices to the telephone line, hold the line open to permit answering an incoming call without undue haste and to effect transmission of ambient sounds over the line to simulate inhabitation of the dwelling in which the receiver is located. A first relay responds to the ringing cycle to charge a storage device to a predetermined energy level that energizes a second relay through a solid state switch device, the latter being responsive to a lesser energy level to cause deactivation of the said second relay. The rate of charge and discharge of the storage device are selectively controlled to effect seizure and subsequent disconnection of the telephone line after selected intervals of line seizure. The second relay effects line seizure and peripheral equipment energization and the interfacing of the latter with said telephone line.

10 Claims, 1 Drawing Figure

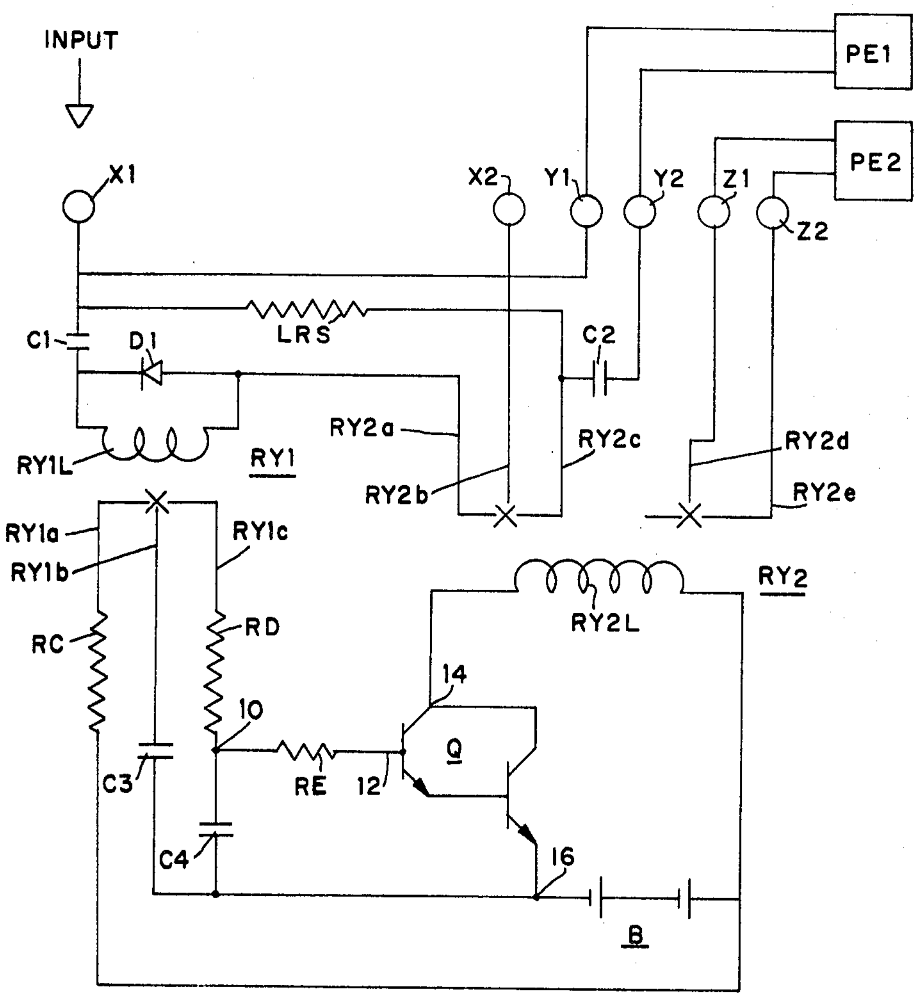
INVENTOR
C. M. AULT
BY Millen, Raptes + White
ATTORNEY

AUTOMATIC TELEPHONE INTERFACE DEVICE

This invention relates to Automatic Telephone Interface Devices and more particularly to an interface between a telephone circuit and peripheral equipment such as recording or transmitting instruments which are programmed to accept or transmit intelligence over a telephone line upon the occurrence of a predetermined ringing sequence.

Automatic interfacing of peripheral equipment with telephone receiving circuits as highly desirable for information transmission and retrieval as well as for the purpose of simulating ambient sounds at a telephone receiver to give an indication to a calling party that a dwelling or the like is occupied. This latter function serves to discourage burglary and vandalism of residential and business properties.

Furthermore, such automatic interfacing also provides means by which a remote indication in a dwelling can be utilized to indicate the reception of a proper calling sequence and the circuit can be seized and held to receive such a call without the incessant ringing normally attendant to the reception of a call when one is a substantial physical distance from the receiver.

It is an object of the present invention to provide new and novel circuitry designed to effect an electronic connection of peripheral equipment to a telephone line after a calling sequence has been accomplished.

It is another object of the present invention to provide a new and novel circuit means for effecting an electronic connection of peripheral equipment to a telephone line after a calling sequence has been accomplished, said circuit means effectuating a line seizure and subsequently connecting the peripheral equipment for intelligence injection or extraction over the line.

It is another object of the present invention to provide new and novel circuit means permitting telephone interrogation of instrumentation programmed to provide coded data upon actuation.

Another object of the present invention is to provide a new and novel interface circuitry for telephone lines for energizing peripheral equipment associated therewith such as receiving and recording devices, prerecorded playback devices, background noise simulators to simulate occupancy or a residence or business establishment to deter possible crime or vandalism and automated line seizing and holding devices to permit the recipient of a call an extended time to reach the telephone before the circuit has been broken.

Yet another object of the present invention is to provide new and novel interface circuitry for telephone lines and the like in which the delay time prior to line seizure is controlled by a predetermined portion of a ringing sequence to minimize disturbance at the receiving end of the line, including means at the receiving end providing either a silent or remote indication that the telephone line has been seized and a call is awaiting a response.

These and other objects of the present invention will become more fully apparent with reference to the following specification and drawing which relate to a preferred embodiment of the invention.

In the drawings:

FIG. 1 is a schematic circuit diagram of the automatic telephone interface device of the present invention.

Basically, the present invention comprises a circuit arranged to effect an electronic connection of peripheral equipment to a telephone line after a calling sequence has been accomplished. Line seizure is consumated subsequent to the calling sequence and the peripheral equipment is electronically connected for intelligence injection or extraction into or out of the telephone line. In the quiescent state of the interface circuitry of the present invention, the components of the circuit are electrically isolated from the telephone circuit and the telephone circuit sees a substantially infinite resistance. When an appropriate sequence of dialing operations has been completed at some remote point in the interconnected telephone circuit, a ringing cycle is initiated at the receiving terminal. This ringing cycle consists of a succession of alternating voltage cycle trains which continue until the line is terminated (seized) with a suitable resistive or reactive load or the calling operation is terminated. The interface circuit has a vibrating relay which receives the ring signal and vibrates at the frequency of the alternating voltage ringing signal. The vibrating armature causes a voltage to be incrementally impressed on a storage means at a rate depending upon the frequency of the voltage ringing signal and the duration thereof. When the charge on the storage means reaches a sufficient level, the interface device is activated to seize the line and energize selected peripheral equipment devices. Means are provided in the interface circuit means to adjust the delay for affecting line seizure, and for adjusting the holding period subsequent to initial seizure of the line.

Referring in detail to the drawing, the present invention is shown as including a ringing cycle relay RY1 and a line seizing and peripheral equipment control relay RY2.

The ringing cycle relay RY1 includes a normally closed contact pair RY1A and RY1B and normally open contact RY1C. The line seizing and equipment control relay RY2 includes a first normally closed relay contact pair RY2A–RY2B a first normally open contact RY2C and a normally open contact pair RY2-D–RY2E. The coil RY1L of the ringing cycle relay RY1 is shunted by diode D1 which has its cathode connected through a first capacitance C1 to a first ringing input terminal X1. A second input terminal X2 is provided which is directly connected to the contact RY2B and a normally closed contact pair RY2A–RY2B of the line seizure relay RY2. A line seizing resistance RS is connected directly from the first input terminal X1 to the normally open relay contact RY2C of the line seizure control relay RY2. A first pair of peripheral equipment control terminals Y1 and Y2 are directly connected, respectively, to the first input terminal X1 and through a second capacitance C2 to the normally open contact RY2C of the line seizure relay RY2. First peripheral equipment means PE1, directly interfaced with the telephone input terminals X1 and X2, is connected across the first peripheral equipment terminals Y1 and Y2. A second pair of peripheral equipment control terminals Z1 and Z2 are directly connected to the line seizure control relay terminals RY2D and RY2E. These latter terminals serve as an on/off switch for second peripheral equipment means PE2 which is not directly interfaced with the telephone line but which is adapted to be activated thereby in response to a proper ringing sequence.

The first contact RY1A of the ringing cycle relay RY1 is connected through a resistance RC to the positive terminal of a DC source B, the negative terminal of the latter being connected to the second normally closed terminal RY1B of the ringing cycle relay RY1 through a storage capacitor C3 and through a holding capacitor C4, junction 10, and time delay resistance RD, to the normally open contact RY1C of the ringing cycle relay RY1. The circuit junction 10 is connected through an input resistance RD to the base terminal 12 of a two-transistor switch Q, the latter having a common collector terminal 14 connected to one side of the coil RY2L of the line seizure control relay RY2. The opposite side of the coil RY2L is directly connected to the positive terminal of the DC source B. The free emitter terminal 16 of the transistor switch Q is connected to the negative terminal of the DC source B.

OPERATION

When an incoming ring signal occurs across the input terminals X1 and X2, the resulting alternating voltage is impressed on the capacitor C1 and the coil RY1L of the ringing cycle relay RY1, the latter being shunted by the diode D1, causing the armature of the relay RY1 to vibrate at the frequency of the alternating voltage comprising the ringing signal.

In the normally closed or quiescent state, the contacts RY1A and RY1B of the relay RY1 are normally closed and impress a voltage from the DC source B through the resistance RC onto the storage capacitor C3, thus storing a given amount of energy thereon. Upon the initiation of the ringing signal, the normally open contact RY1C and the contact RY1B close on each alternate half cycle of the ringing voltage due to the vibration in the armature of the relay RY1 and the energy stored in the storage capacitor C3 is transmitted through the timing resistance RD into the time delay capacitance C4 through the junction 10. Because of the shunting action of the diode D1, the contact RY1C is closed only for the first half cycle of the ringing signal and the second half cycle is shunted through the diode D1 permitting the armature of the relay to open and disengage the contacts RY1B – RY1C. Therefore, depending upon the time constant of the timing circuit RD–C4, a portion of the energy stored in the storage capacitance C3 is transmitted to the holding capacitor C4. Thus, each alternating voltage cycle in a telephone ringing signal causes the voltage across the electrodes of the holding capacitance C4 to continue to increase to some value which a function of the leakage current of the holding capacitance C4, the series resistance of the input resistance RE and the internal junctions in the transistor switch Q.

When the voltage at the base 12 of the transistor switch Q obtains a critical bias voltage, the combined currents through the common collector terminal 14 through and the coil RY2L of the seizure control relay RY2 cause the armature of the said relay RY2 to close thereby closing terminals RY2B – RY2C and RY2D – RY2E. The line seizure control relay RY2 will now remain closed for a period determined by the value of the input resistor RE and the rate of dissipation of the energy stored in the holding capacitance C4.

With the actuation of the line seizure control relay RY2, the normally closed contact pair RY2A – RY2B of this relay is caused to open, thereby connecting the line seizing resistance RS across the input terminals X1 and X2 through the now closed relay contact pair RY2B – RY2C.

The closing of the normally opened contacts RY2B – RY2C connects the peripheral equipment terminals Y1 and Y2 directly into the telephone line, thereby interfacing the first peripheral equipment means PE1 directly with the telephone line.

Furthermore, the normally opened contact pair RY2D – RY2E is now closed, serving to energize the second peripheral equipment means PE2 which is not interfaced with the telephone line but which is coordinated therewith.

The peripheral equipment means PE1 and PE2 will now remain energized for a predetermined period controlled as follows:

The transistor switch Q will remain on and the line seizure control relay RY2 will remain energized so long as sufficient charge is present on the holding capacitor C4 to cause current to flow through the input (holding) resistance RE into the base 12 of the transistor switch Q. When the electrical energy stored in the holding capacitor C4 decreases to a critical or cut off value, the bias voltage level at the base 12 of the transistor switch Q will be reduced to a sufficient level to cause a decay of magnetic flux in the coil RY2L of the line seizure control relay RY2, permitting the contact pairs RY2B – RY2C and RY2D – RY2E to open and further permitting the normally closed contact pair RY2A – RY2B to close. The latter closure disconnects the line seizing resistance RS from its previous connection across the input terminal X1 and X2 and returns these terminals to a connection through the capacitance C1, diode D1 and coil RY1L of the ringing cycle relay RY1. This presents a substantially infinite resistance to the telephone line, causing the line to open and terminate the calling sequence.

By the same token, the reopening of the normally opened contact pairs RY2B – RY2C and RY2B – RY2E terminates the interfacing of the first peripheral equipment means PE1 with the telephone line, and turns off the non-interfaced but coordinated second peripheral equipment means PE2.

From the foregoing specification and drawing it can readily be seen that by varying the time constant of the circuit RE-C4, as well as the time constant of the circuit RD-C4, the telephone interface device of the present invention can readily be adjusted to respond to a predetermined ringing cycle sequence and then subsequently hold the telephone line in a seized condition with the attendant energization of interfaced and interconnected peripheral equipment means PE1 and PE2 for a predetermined interval or delay period before returning the telephone line to an open condition.

Therefore, telephonic interrogation of instrumentation can be effected as well as recording of information.

Another highly desirable feature of the present invention is that it can selectively provide background music or other ambient sounds typical of a dwelling or business establishment which will indicate to the caller that the dwelling or business establishment is occupied. This will serve to discourage burgulary and vandalism of residential and business properties. For example, the second peripheral equipment means PE2 could well be a radio or playback device for simulating the desired ambient sounds to a party calling in on the telephone line.

The initial response of the ringing cycle relay RY1, storage capacitance C3, and delay capacitance C4 can be preset such that only a portion of an initial ringing cycle would be sufficient to trigger the interface device and interconnect either the peripheral devices or merely put the telephone line in a seized condition and maintain it in that condition for a sufficiently extended period of time to permit the answering party to take an incoming call without the disturbance of continuous ringing. In this regard, the peripheral equipment means PE2 could also be a remote indicating device in any room or area of a dwelling or the like which would indicate to a party at the receiving end of the call that the line had been seized and was awaiting an answer.

What is claimed:

1. A telephone interface circuit for seizing and holding a telephone line in response to a ringing signal, selectively energizing and interfacing peripheral equipment with said line for a predetermined interval subsequent to seizure of the line, and terminating seizure of said line at the end of said interval comprising:

a telephone line;

first relay means interconnected with said line and actuated on alternate half cycles of a ringing signal thereon;

a source of electrical energy;

first storage means interconnected with said source in the absence of and during the other of said alternate half cycles of said ringing signal through said first relay means;

time delay means including second storage means selectively interconnected with said first storage means on said alternate half cycles of said ringing signal by said first relay means to incrementally store a portion of said stored energy from said first storage means in said second storage means for a preselected number of said half cycles;

second relay means;

solid state means, interconnected with said time delay means and said second relay means, actuated in response to a predetermined energy level in said second storage means to connect said source with said second relay means to energize the latter;

line seizing means selectively interconnected with said line by said second relay means; and peripheral equipment terminal means selectively interfaced with said telephone line and activated by said second relay means in response to said ringing signal for a time interval determined by said time delay means.

2. The invention defined in claim 1, wherein said second relay means includes an actuating coil; and wherein said solid state means comprises transistor means switching said coil in series with said source in response to a first energy level in said second storage means and disconnecting said coil from said source in response to a second energy level in said second storage means.

3. The invention defined in claim 1, wherein said time delay means includes first control means controlling the rate of transfer of energy from said first to said second storage means and second control means controlling the rate of dissipation of stored energy in said second storage means.

4. The invention defined in claim 1, wherein said time delay means includes first control means controlling the rate of transfer of energy from said first to said second storage means and second control means controlling the rate of dissipation of stored energy in said second storage means;

wherein said second relay means includes an actuating coil; wherein said solid state means comprises transistor means switching said coil in series with said source in response to a first energy level in said second storage means and disconnecting said coil from said source in response to a second energy level in said second storage means;

wherein said transistor means includes an input terminal; and wherein said second control means comprises circuit means conducting stored energy from said second storage means to said input terminal to effect a controlled dissipation of said stored energy through said transistor means.

5. Means seizing a telephone line in response to a ringing signal of predetermined duration, comprising:

relay means having an actuating coil means connected across a telephone line, said coil means being responsive to alternate half-cycles of a ringing signal on said line and an armature having first and second normally closed and a third normally open contact;

a source of electrical energy having one side thereof connected with said first contact;

first energy storage means connected from said second contact to the opposite side of said source;

second storage means connected from said third contact means to the said opposite side of said source;

circuit means responsive to a predetermined level of stored energy in said second storage means to effect a seizure of said telephone line;

said second storage means including time delay means controlling the rate of input of energy thereto; and said second and third contacts being engaged on said alternate half-cycles of said ringing signal by said armature means to transfer a predetermined amount of energy from said first storage means into said second storage means on each said alternate half-cycle of said ringing signal until said predetermined level is achieved.

6. The invention defined in claim 5, wherein said first storage means comprises a first capacitance; and wherein said second storage means comprises a second capacitance, said time delay means comprising a timing resistance in series with said second capacitance, said third contact and said other side of said source.

7. A telephone interface circuit for seizing and holding a telephone line in response to a ringing signal for a predetermined interval subsequent to seizure of the line, and terminating seizure of said line at the end of said interval comprising:

a telephone line;

first relay means interconnected with said line and actuated on alternate half cycles of a ringing signal thereon;

a source of electrical energy;

first storage means interconnected with said source in the absence of and during the other of said alternate half cycles of said ringing signal through said first relay means;

time delay means including second storage means selectively interconnected with said first storage means on said alternate half cycles of said ringing signal by said first relay means to incrementally store a portion of said stored energy from said first storage means in said second storage means for a preselected number of said half cycles;

second relay means;

solid state means, interconnected with said time delay means and said second relay means, actuated in response to a predetermined energy level in said second storage means to connect said source with said second relay means to energize the latter; and line seizing means selectively interconnected with said line by said second relay means for a time interval determined by said time delay means.

8. The invention defined in claim 7, wherein said second relay means includes an actuating coil; and wherein said solid state means comprises transistor means switching said coil in series with said source in response to a first energy level in said second storage means and disconnecting said coil from said source in response to a second energy level in said second storage means.

9. The invention defined in claim 7, wherein said time delay means includes first control means controlling the rate of transfer of energy from said first to said second storage means and second control means controlling the rate of dissipation of stored energy in said second storage means.

10. The invention defined in claim 7, wherein said time delay means includes first control means controlling the rate of transfer of energy from said first to said second storage means and second control means controlling the rate of dissipation of stored energy in said second storage means;

wherein said second relay means includes an actuating coil; wherein said solid state means comprises transistor means switching said coil in series with said source in response to a first energy level in said second storage means and disconnecting said coil from said source in response to a second energy level in said second storage means;

wherein said transistor means includes an input terminal; and wherein said second control means comprises circuit means conducting stored energy from said second storage means to said input terminal to effect a controlled dissipation of said stored energy through said transistor means.

* * * * *